United States Patent [19]

Scott

[11] Patent Number: 5,593,283
[45] Date of Patent: Jan. 14, 1997

[54] FAN AND FAN DRIVE AND ASSEMBLY THEREOF

[75] Inventor: George E. Scott, Marshall, Mich.

[73] Assignee: Eaton Corporation, Cleveland, Ohio

[21] Appl. No.: 620,062

[22] Filed: Mar. 21, 1996

Related U.S. Application Data

[63] Continuation-in-part of Ser. No. 287,388, Aug. 8, 1994, Pat. No. 5,501,010.

[51] Int. Cl.$^6$ ........................................ F04D 29/64
[52] U.S. Cl. .................... 416/244 R; 416/169 A
[58] Field of Search ................ 416/169 A, 170 R, 416/204 R, 244 R, 93 R

[56] References Cited

U.S. PATENT DOCUMENTS

| | | |
|---|---|---|
| 3,642,382 | 2/1972 | Hayashi . |
| 3,914,069 | 10/1975 | Arrington et al. . |
| 4,150,919 | 4/1979 | Matucheski . |
| 4,169,693 | 10/1979 | Brubaker . |
| 4,252,504 | 2/1981 | Covington et al. . |
| 4,271,946 | 6/1981 | Bridge . |
| 4,487,551 | 12/1984 | Mizutani et al. . |
| 4,735,300 | 4/1988 | Brown . |
| 5,002,462 | 3/1991 | Janisse . |

FOREIGN PATENT DOCUMENTS 301750  7/1919  Germany ..................... 416/244 R

*Primary Examiner*—James Larson
*Attorney, Agent, or Firm*—L. J. Kasper

[57] ABSTRACT

A fan (31) and fan drive (11) assembly in which the fan includes a spider (33), typically a metal stamping, defining fastener openings (41), each including larger opening (43) and a smaller opening (45). Adjacent the smaller opening, the spider defines a raised ramp portion (47). The fan drive includes an output (13) defining fan mounting portions (21), each of which includes a head portion (25), and a shank portion (27). Upon assembly, the head portions (25) align with, then pass axially through the larger openings (43), then the fan is rotated relative to the fan drive, resulting in the shank portions (27) moving into the smaller openings (45) and the head portions (25) passing over and deforming the ramp portions (47), thus tightly engaging the fan spider (33) to the fan drive output member (13). The invention provides an assembly and method which eliminate the need for bolts, and the associated drilling and tapping of threaded holes in the output member, as well as the time-consuming bolting process in the assembly plant, and the periodic bolt strippage and associated warranty problems.

15 Claims, 3 Drawing Sheets

FAN AND FAN DRIVE AND ASSEMBLY THEREOF

CROSS REFERENCE TO RELATED APPLICATION

This application is a continuation-in-part of application U.S. Ser. No. 287,388, filed Aug. 8, 1994, in the name of George E. Scott, for a "FAN AND FAN DRIVE AND METHOD OF ASSEMBLY THEREFOR", U.S. Pat. No. 5,501,010.

BACKGROUND OF THE DISCLOSURE

The present invention relates to an assembly of a fan and a fan drive, and more particularly, to an improved structure and method relating to the assembling of the fan and fan drive.

It will become apparent to those skilled in the art from the subsequent description that the structure and assembly method of the present invention may be utilized advantageously with various types of fans, as well as with various types of fan drives. However, the invention is especially useful for assembling a radiator cooling fan, for cooling a vehicle engine, to a viscous fan drive, and the invention will be described in connection therewith. The invention is also especially useful when the fan is of the type having a hub portion and fan blades molded integrally therewith from a plastic material, and an annular metal spider having its outer periphery attached to the hub portion and its inner periphery attached to the housing of the viscous fan drive. Such a fan and fan drive assembly is illustrated and described in U.S. Pat. No. 4,169,693, assigned to the assignee of the present invention and incorporated herein by reference.

Typically, the viscous fan drive and the radiator cooling fan have been manufactured and shipped separately to the vehicle OEM assembly plant (i.e., either the engine assembly plant or the final vehicle assembly plant).

It has been conventional practice to provide the housing of the viscous fan drive with a plurality (typically, four) of threaded bores. Then, on the moving assembly line at the vehicle OEM assembly plant, the assembler must position the fan on the fan drive, insert a bolt in each threaded bore, and "torque" or tighten each of the bolts to the appropriate level of tightness. The tightening of the bolts is normally done with a pneumatic (air) gun. It should be noted that the assembler typically has less than about one minute to assemble the fan to the fan drive and then put that assembly on the water pump, either by bolting it to the water pump or threading it onto the water pump shaft.

Although the above-described assembly routine has been generally satisfactory, in terms of the product of the final assembly, the occurrence of bolt strippage problems in the assembly plant has been undesirably high. One reason for the occurrence of bolt strippage is that the assembler, in order to keep pace with the movement of the assembly line, may actually start the bolt into the fan drive housing using the air gun, which may result in cross-threading of the threaded bores, unless the bolt and the bore are in nearly perfect alignment, which is difficult on the moving assembly line. Occasionally, the assembler will be given the wrong bolts (for example, ones which are too short), and the attempt to insert the incorrect bolts (or overtorquing bolts which are too short) results in damage to the threads of the fan drive housing. In either case, the result is that one or more of the threaded bores in the fan drive housing is stripped, and the fan drive either becomes a warranty return, and is shipped back to the viscous fan drive manufacturer, or is merely discarded, representing a loss for the vehicle OEM.

The above-described problems are somewhat common on the typical fan and fan drive assembly requiring four bolts, but there is obviously even greater opportunity for bolt strippage and damage to the fan drive on some of the newer, larger fans and fan drives which require six bolts.

SUMMARY OF THE INVENTION

Accordingly, it is an object of the present invention to provide an improved fan and fan drive and method of assembly therefor which can substantially eliminate the problems associated with bolt strippage in the OEM assembly plant.

It is a more specific object of the present invention to provide an improved method of assembling a fan and fan drive which substantially eliminates the opportunity for cross-threading of the bolts in the OEM assembly plant by eliminating the use of bolts and threaded bores in the fan drive, to attach the fan to the fan drive.

The above and other objects of the invention are accomplished by the provision of an improved fan and fan drive assembly including a fan drive of the type comprising an output member, and a fan of the type comprising a mounting portion adapted to be attached to the output member of the fan drive, and a plurality of fan blades oriented for a normal direction of operation. The output member of the fan drive includes a plurality N of fastener members, each including a head portion and a shank portion disposed between the head portion and an adjacent surface of the output member, the head portion and the adjacent surface defining an axial dimension Y. The mounting portion of the fan has an axial thickness X and further defines a plurality N of fastener openings, each of which is adapted to receive one of the fastener members.

The improved assembly is characterized by:

(a) each of the fastener openings comprising a relatively larger head receiving portion and a relatively smaller shank receiving portion;

(b) the dimension Y being at least slightly greater than the axial thickness X;

(c) retention means is operably associated with each of the shank receiving portions, and disposed axially between the adjacent surface of the output member and the respective one of the head portions, and operable to retain each of the fastener members in a fixed position, circumferentially, relative to the fan as the fan drive output member and fan are in an assembled position and rotate in the normal direction of operation.

DESCRIPTION OF THE PREFERRED EMBODIMENTS

Figure 1:
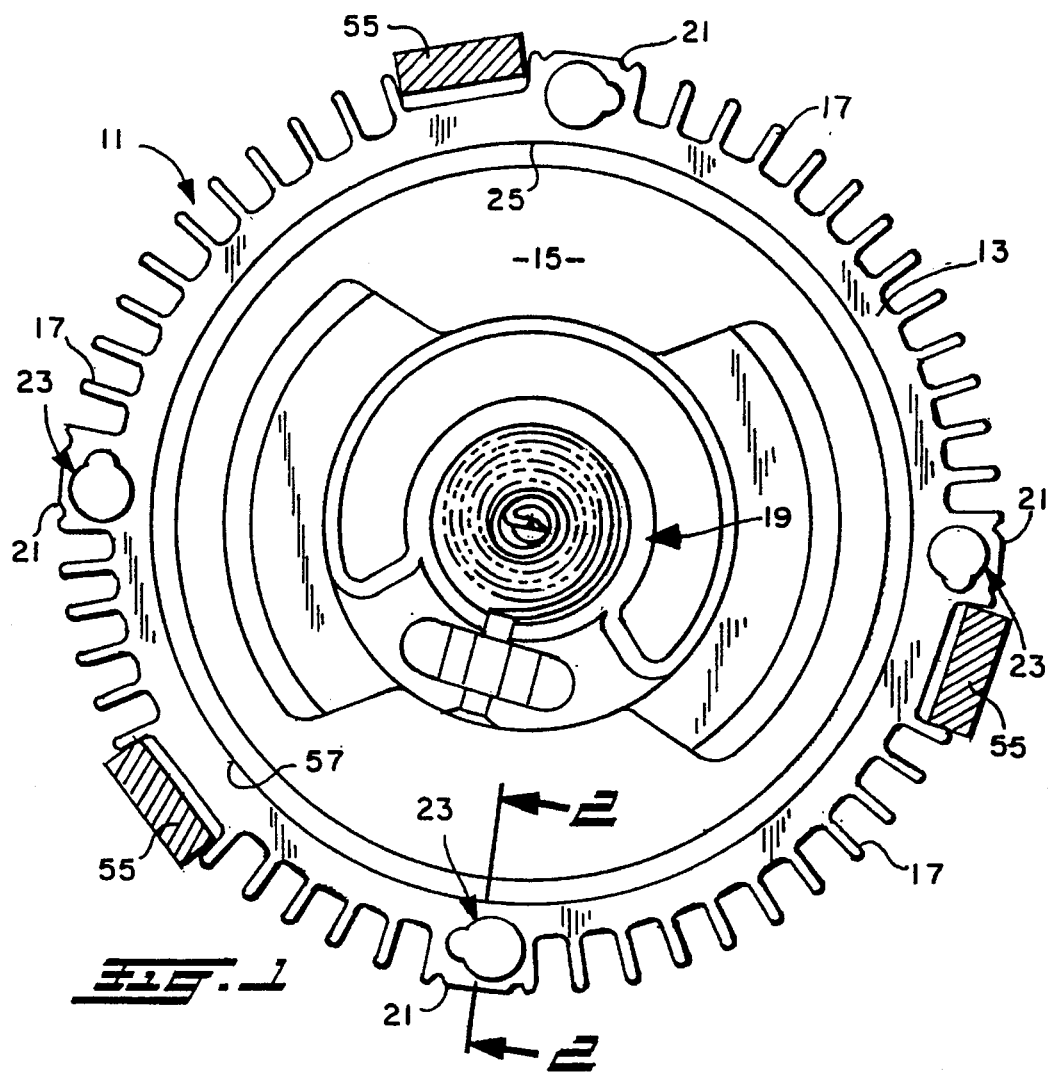
FIG. 1 is a front plan view of a fan drive of the type with which the present invention may be utilized, with the fan drive being disposed within an assembly fixture.

Referring now to the drawings, which are not intended to limit the invention, FIG. 1 illustrates a viscous fan drive, generally designated 11, of the type with which the present invention may be utilized. The particular viscous fan drive 11 illustrated in FIG. 1 is sold commercially as a Series 130 viscous fan drive, by the assignee of the present invention. The viscous fan drive 11 may be made in accordance with the teachings set forth in U.S. Pat. Nos. 4,271,946 and 4,735,300, both of which are assigned to the assignee of the present invention and incorporated herein by reference. The viscous fan drive 11 will be described only briefly herein in view of the above incorporation of patents.

The viscous fan drive 11 includes a body member 13, most of which is hidden from view in FIG. 1 by a cover member 15. The body member 13 includes a plurality of peripheral cooling fins 17 which, as is well known to those skilled in the art, serve to transfer heat away from the body member 13, the heat being generated in response to the transmission of torque from an input member (not shown herein; see incorporated patents) to the "output" of the fan drive 11. The output comprises the assembly of the body member 13 and cover member 15.

The particular viscous fan drive 11 illustrated in FIG. 1 is of the temperature-sensing type and therefore, includes a bi-metal coil assembly 19 mounted on the forward surface of the cover member 15, and operable to control the amount of viscous fluid in an operating chamber (not shown herein), in a manner well known to those skilled in the art.

Figure 2:
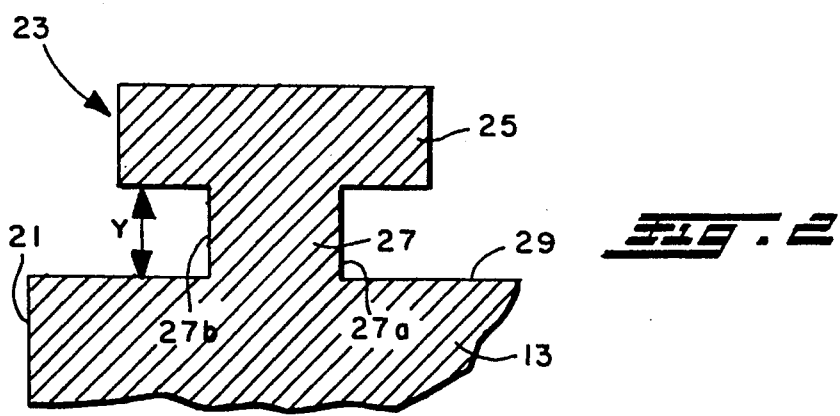
FIG. 2 is an enlarged, fragmentary axial cross-section, taken on line 2—2 of FIG. 1, illustrating the fastener member of the present invention.
Figure 4:
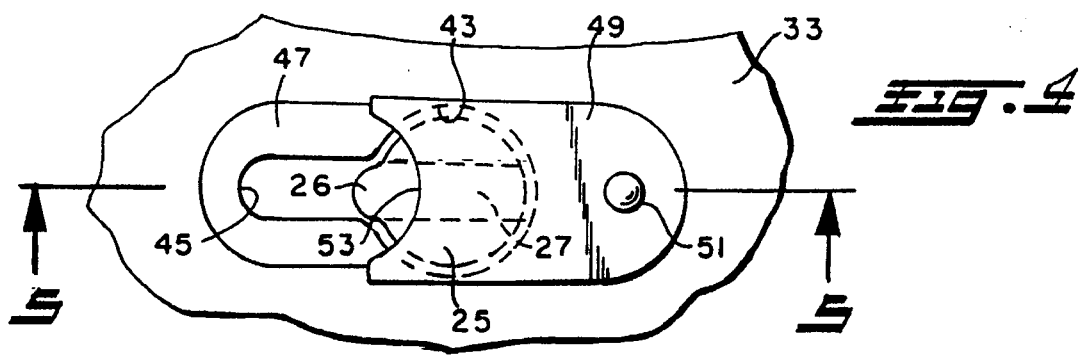
FIG. 4 is an enlarged, fragmentary, front plan view, illustrating the relationship of the fan and fan drive at the FIG. 5 is an axial cross section, taken generally on line 5—5 of FIG. 4.
Figure 7:
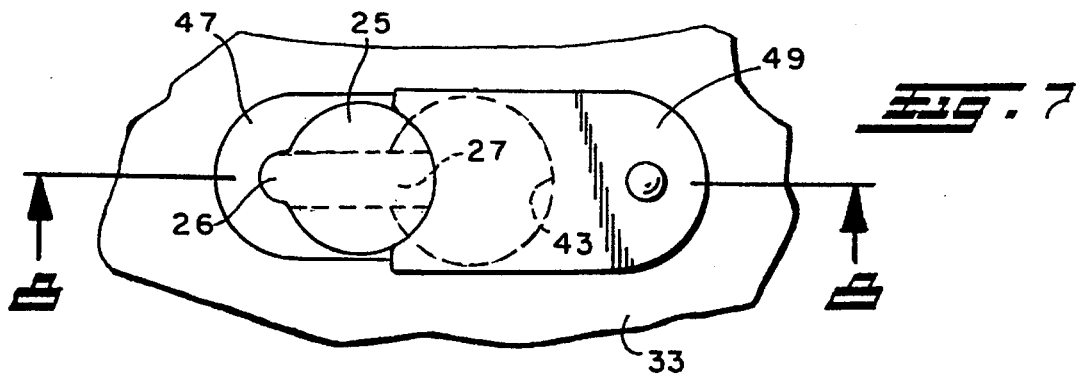
FIG. 7 is an enlarged, fragmentary, front plan view, similar to FIG. 4, and on the same scale, illustrating the relationship of the fan and fan drive upon completion of the process of assembling the present invention.

The body member 13, in the subject embodiment, and by way of example only, includes four fan mounting portions, generally designated 21, and as may better be seen in FIG. 2, each of the fan mounting portions 21 includes a fastener member, generally designated 23. Each of the fastener members 23 includes a head portion 25, which is generally cylindrical, except for a semi-cylindrical nose portion 26 (as shown in FIGS. 4 and 7), the function of which will become apparent. Each fastener member 23 also includes a shank portion 27, interconnecting the head portion 25 with an adjacent surface 29 of the mounting portion 21. The undersurface of the head portion 25 and the adjacent surface 29 define an axial dimension Y, the significance of which will be described in greater detail subsequently. In the subject embodiment, the body member 13 comprises an aluminum casting, and it is preferred, although not essential to the invention, that the fasteners members 23 be cast integrally with the body member 13, and the head portion 25 may be used as cast, although it may be necessary to machine radially inner and outer flank surfaces 27a and 27b, respectively. Although one particular configuration of fastener member 23 has been illustrated by way of example only, the present invention is not limited to any particular configuration of fastener member or head type. Instead, within the scope of the present invention, the fasteners may be of any configuration which is consistent with the practice of, and permits the assembly method to be described subsequently.

Figure 3:
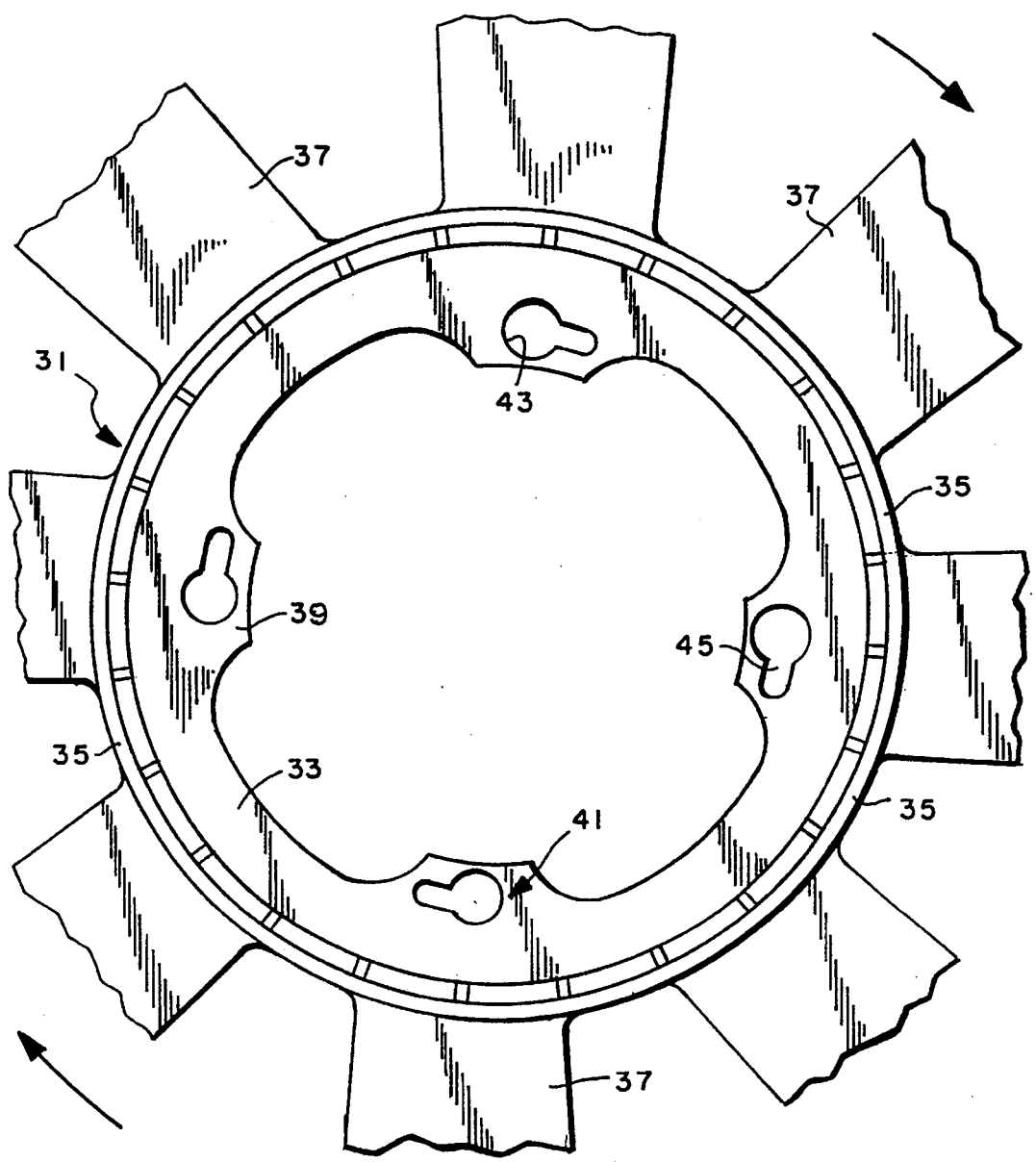
FIG. 3 is a fragmentary, front plan view of a fan of the type with which the present invention may be utilized, but on a smaller scale than FIG. 1.

Referring now to FIG. 3, there is illustrated a front plan view of a fan assembly, generally designated 31, which includes two primary elements. The first is a stamped metal spider 33 which typically includes an outward, peripheral portion (not shown herein; see incorporated patents). The second element is a molded, integral assembly comprising a fan hub 35, which is typically molded about the outer peripheral portion of the spider 33, and a plurality of fan blades 37. It is believed to be within the ability of those skilled in the art to mold the assembly of the fan hub 35 and fan blades 37 in place about the metal spider 35. Such a molding method is not an essential feature of the present invention, however, and therefore will not be described further herein. It is also within the scope of the present invention for the fan to comprise a stamped steel fan, which can have any one of a number of different configurations. All that is required for the present invention is that there be a portion such as the spider 33 which is adapted to be attached to the fan drive, and within the scope of the present invention, the spider 33 does not have to comprise a metal stamping, but could, for example, comprise a thin part molded from an appropriate plastic material.

In accordance with one important aspect of the present invention, the metal spider 33 includes four mounting portions 39, each of which defines a fastener opening, generally designated 41. Obviously, the four fastener openings 41 must be positioned to correspond to the locations of the four fan mounting portions 21. Each fastener opening 41 includes a first, larger opening portion 43, also referred to hereinafter as a head receiving portion, and a second, smaller opening portion 45, also referred to hereinafter as a shank receiving portion. As may best be seen in FIGS. 3 and 4, the first and second opening portions 43 and 45 together comprise one continuous fastener opening 41, for reasons which will become apparent subsequently. Typically, each fan drive 11 is designed to operate in one particular direction of rotation, here assumed to be the clockwise direction as viewed in FIG. 1. The fan assembly 31 is also designed for the same direction of operation, i.e., in terms of the orientation of the fan blades 37. Therefore, in accordance with the present invention, the smaller opening portion 45 "leads" the larger opening portion 43 in the intended direction of rotation (see arrows in FIG. 3) of the fan assembly 31.

Figure 5:
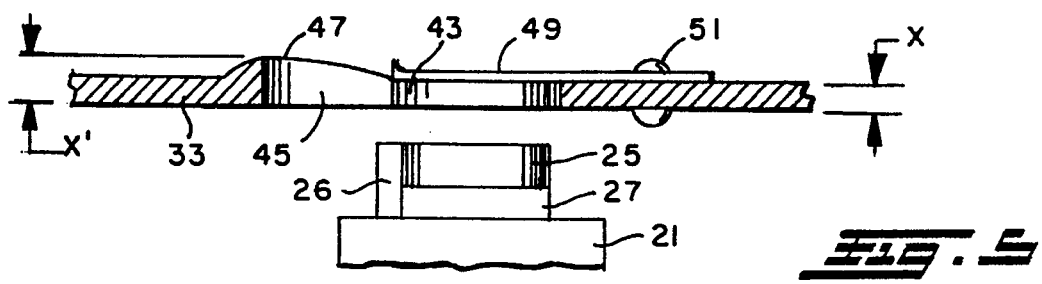

Referring now primarily to FIGS. 4 and 5, in conjunction with FIG. 3, it should be understood that, as shown in FIG. 3, the stamped metal spider 33 is "incomplete". In FIGS. 4 and 5 it may be seen that around the smaller opening portion 45 is a raised ramp portion 47, which is preferably formed in the manner shown during the stamping of the spider 33 (or the molding, etc.). The portion 47 is referred to as a "ramp" because it starts even with the larger opening portion 43 adjacent thereto, and slopes upward along the length of the smaller opening portion 45, in a direction away from the larger opening 43. Thus, whereas the spider 33 has a nominal thickness X, the ramp portion 47 gradually increases to a thickness X' (see FIG. 5).

In addition, associated with each fastener opening 41 is a spring steel lock member 49, which would typically be attached to the spider 33 by any suitable means, such as a rivet 51. The function of the lock member 49 will be described in connection with the explanation of the assembly method. The lock member 49 covers most of the larger opening 43 when the fan and fan drive are in the pre-assembly position of FIG. 4, and the member 49 includes a part-circular end surface 53 which approximately conforms to the head portion 25, for reasons which will become apparent subsequently.

Assembly Method

The assembly method of the present invention will now be described. Referring now primarily to FIGS. 1 and 4, when the fan drive 11 and the fan assembly 31 are brought together at the OEM assembly plant, the fan drive 11 is preferably placed in a fixture, the only portions of the fixture shown in FIG. 1 being the three jaw pieces 55, which receive the body member 13 of the fan drive and prevent rotation thereof during the subsequent assembly steps. After the fan drive 11 is placed within the jaw pieces 55, the fan assembly 31 is put in place with the mounting portions 39 engaging a pilot diameter 57, defined by the body member 13. The fan assembly 31 is positioned, rotationally, such that each of the larger opening portions 43 fits over its respective head portion 25, as shown in FIGS. 4 and 5.

Figure 6:
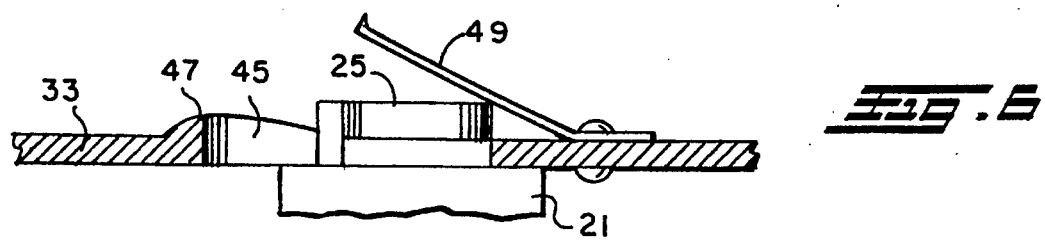
FIG. 6 is an axial cross section, similar to FIG. 5, and on the same scale, illustrating an intermediate step in the process of assembling the present invention.

The fan assembly 31 is then moved axially toward the fan drive 11, such that each head portion 25 begins to pass through its respective larger opening 43, and engage the underside of the respective lock member 49, pushing and pivoting it "upward" as shown in FIG. 6 (or axially forward if the fan and fan drive are oriented with their axes horizontal). When the fan assembly 31 reaches the position illustrated in FIG. 6, relative to the fan drive, the underside of the metal spider 33 engages the adjacent surface 29 of each of the fan mounting portions 21, thus limiting further relative axial movement of the fan and fan drive. In the subject embodiment of the invention, the spider has an axial thickness X, wherein the axial dimension Y is at least slightly greater than the axial thickness X, thus making it possible for the spider thickness to fit between the head portion 25 and the adjacent surface 29.

When the fan assembly 31 is in the position shown in FIG. 6, with the spider 33 engaging the adjacent surface 29, the next step is to rotate the fan assembly 31 counterclockwise from the position shown in FIG. 6 to the position shown in FIG. 7. Note that the arrows shown in FIG. 3 indicate the direction of rotation of the fan and fan drive assembly during operation. Therefore, as the fan assembly 31 is rotated to the position shown in FIG. 7, the raised ramp portion 47 on either side (radially) of the smaller opening portion 45 passes under the head portion 25, and is deformed thereby, and the shank portion 27 passes into the smaller opening portion 45, until the nose portion 26 engages the circular end of the opening portion 45, which serves as a stop, limiting further relative rotation between the fan and fan drive. As the head portion 25 moves up the ramp portion 47, from the position shown in FIG. 6 to that shown in FIG. 8, the progressive deformation of the ramp portion 47 results in gradually greater force of engagement and retention between the fan and fan drive. It is believed to be within the ability of those skilled in the art to select the appropriate dimensional relationships, such as for the ramp portion 47, to achieve the necessary engagement and retention force between the fan and the fan drive.

Figure 8:
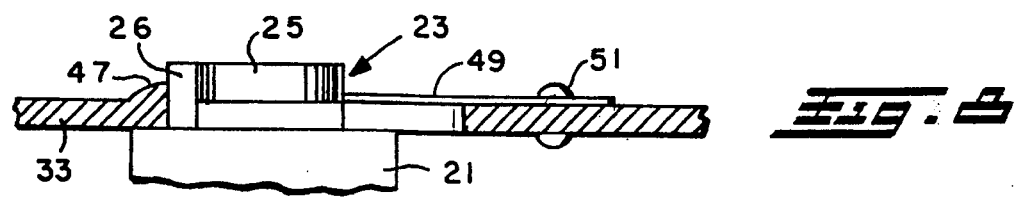
FIG. 8 is an axial cross section, taken generally on line 8—8 of FIG. 7.

When the fan assembly 31 reaches the position shown in FIG. 7, the spring steel lock member 49 returns to its normal, original position, as shown in FIG. 8, with the end surface 53 engaging the head portion 25, and locking the fastener member 23 in the assembled position, relative to the spider 33. Under normal operation conditions, the fan assembly will be driven clockwise in FIG. 1 and 3 by the engagement of the fastener member 23 and the spider 33. However, there are situations wherein the fan will overrun the fan drive, and one function of the lock members 49 is further to ensure that the shank portion 27 remains in the smaller opening portion 45, even though the deformation of the ramp portion 47 would normally provide sufficient clamping force, in and of itself, to prevent any tendency for "back-out" to occur.

Although the ramp portion 47, which serves as a retainer, has been illustrated and described as being integral with the spider portion 33, those skilled in the art will recognize that, within the scope of the present invention, a separate retainer member may be inserted into the smaller opening 45, and achieve the same ramping, deformation, engagement, and retention as already described. Therefore, references in the appended claims to a retainer, or retainer means will both be understood to mean and include both the integral ramp portion 47 and a separate retainer.

It may be seen that the method of assembling the present invention greatly simplifies the assembly which must be done in the OEM assembly plant, and will eliminate occurrences of bolt strippage in the assembly plant. It may also be seen that the present invention provides a fan and fan drive which eliminates the need for bolts, thus reducing the number of parts, as well as the associated drilling and tapping of threaded bores in the output member 13, thus eliminating one potential source for scrapped parts. The invention also provides an assembly method which eliminates the time required to thread each bolt into its threaded bore, which is another potential source for scrapped parts, as a result of bolt strippage.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A fan and fan drive assembly including a fan drive of the type comprising an output assembly, and a fan of the type comprising a mounting portion adapted to be attached to said output assembly of said fan drive and a plurality of fan blades oriented for a normal direction of operation; said output assembly of said fan drive including a plurality N of fastener members, each including a head portion; said mounting portion of said fan defining an axial thickness and further defining a plurality N of fastener openings, each of which is adapted to receive one of said fastener members; characterized by:

(a) each of said fastener openings comprising a relatively larger head receiving portion and a relatively smaller retainer receiving portion;

(b) each head portion of said plurality N of fastener members being spaced from an adjacent surface of said output assembly by an axial dimension, said dimension being at least slightly greater than said axial thickness;

(c) a retainer operably associated with each of said retainer receiving portions, and disposed axially between said adjacent surface of said output assembly and the respective one of said head portions, and operable to retain each of said fastener members in a fixed position, circumferentially, relative to said fan, as said fan drive output assembly and fan are in an assembled position and rotate in said normal direction of operation.

2. A fan and fan drive assembly as claimed in claim 1, characterized by said mounting portion of said fan comprising a stamped metal spider having said axial thickness over substantially the entire extent thereof.

3. A fan and fan drive assembly as claimed in claim 2, characterized by said fan further comprising a plastic fan molded in place about said stamped metal spider.

4. A fan and fan drive assembly as claimed in claim 1, characterized by said output assembly including a cast metal member, and said plurality N of fastener members are cast integrally with said cast metal member.

5. A fan and fan drive assembly as claimed in claim 4, characterized by said head portion of each of said fastener members being generally cylindrical and including an undersurface, disposed generally parallel to said adjacent surface of said output assembly, and disposed to engage said retainer when said output assembly and said fan are in said assembled position.

6. A fan and fan drive assembly as claimed in claim 1, characterized by each of said retainer receiving portions extending generally circumferentially from its respective head receiving portion, whereby, after each of said head portions passes through its respective head receiving portion, rotation of the fan relative to said output assembly results in each of said head portions being disposed over the respective retainer receiving portion.

7. A fan and fan drive assembly as claimed in claim 1, characterized by one of said mounting portion and said retainer including additional means operable to prevent movement of each of said fastener members toward its respective head receiving portion of said fastener opening when said output assembly and said fan are in said assembled position.

8. A fan and fan drive assembly including a fan drive of the type comprising an output member; and a fan of the type comprising a mounting portion adapted to be attached to said output member of said fan drive, and a plurality of fan blades, oriented for a normal direction of operation; said output member of said fan drive including a plurality N of fastener members, each including a head portion and a shank portion disposed between said head portion and an adjacent surface of said output member, said head portion and said adjacent surface defining an axial dimension; said mounting portion of said fan having an axial thickness and further defining a plurality N of fastener openings, each of which is adapted to receive one of said fastener members; characterized by:

(a) each of said fastener openings comprising a relatively larger head receiving portion and a relatively smaller shank receiving portion;

(b) said dimension being at least slightly greater than said axial thickness;

(c) retention means operably associated with each of said shank receiving portions, and disposed axially between said adjacent surface of said output member and the respective one of said head portions, and operable to retain each of said fastener members in a fixed position, circumferentially, relative to said fan, as said fan drive output member and fan are in an assembled position and rotate in said normal direction of operation.

9. A fan and fan drive assembly as claimed in claim 8, characterized by said mounting portion of said fan comprising a stamped metal spider having said axial thickness over substantially the entire extent thereof.

10. A fan and fan drive assembly as claimed in claim 9 characterized by said fan further comprising a plastic fan molded in place about said stamped metal spider.

11. A fan and fan drive assembly as claimed in claim 9, characterized by said output member comprising a cast metal member and said plurality N of fastener members are cast integrally with said cast metal member.

12. A fan and fan drive assembly as claimed in claim 11, characterized by said retention means comprises said stamped metal spider having an axial thickness, greater than said axial thickness, adjacent each of said shank receiving portions.

13. A fan and fan drive assembly as claimed in claim 12, characterized by said head portion of each of said fastener members being generally cylindrical and including an under-surface, disposed generally parallel to said adjacent surface of said output member, and disposed to engage said retention means when said output member and said fan are in said assembled position.

14. A fan and fan drive assembly as claimed in claim 13, characterized by said retention means comprises said stamped metal spider defining a ramp surface, adjacent each of said shank receiving portions, said ramp surface defining a progressively increasing axial thickness in a direction away from said head receiving portion, at least a portion of said ramp surface defining an axial thickness slightly greater than said axial dimension.

15. A fan and fan drive assembly as claimed in claim 14 characterized by, as said output member and said fan are relatively rotated to said assembled position, engagement of said undersurface of each head portion and said retention means results in deformation of said retention means.

\* \* \* \* \*